United States Patent [19]

Kim

[11] Patent Number: 5,724,213
[45] Date of Patent: Mar. 3, 1998

[54] HEAD DRUM ASSEMBLY OF VIDEO CASSETTE RECORDER

[75] Inventor: Keum-Mo Kim, Seoul, Rep. of Korea

[73] Assignee: Daewoo Electronics Co., Ltd., Seoul, Rep. of Korea

[21] Appl. No.: 738,866

[22] Filed: Oct. 28, 1996

[30] Foreign Application Priority Data

Oct. 28, 1995 [KR] Rep. of Korea ............. 95-30842 U
Oct. 28, 1995 [KR] Rep. of Korea ............. 95-37792 U

[51] Int. Cl.$^6$ ................................................ G11B 15/61
[52] U.S. Cl. ................................................ 360/107
[58] Field of Search ............................ 360/107, 108, 360/84, 85; 384/114, 115, 377

[56] References Cited

U.S. PATENT DOCUMENTS

| | | | |
|---|---|---|---|
| 4,273,390 | 6/1981 | Swearingen et al. | 308/168 |
| 4,706,143 | 11/1987 | Asada et al. | 360/107 |
| 4,972,283 | 11/1990 | Kim | 360/107 |
| 5,277,499 | 1/1994 | Kameyama | 384/123 |

*Primary Examiner*—Robert S. Tupper
*Attorney, Agent, or Firm*—Beveridge, DeGrandi, Weilacher & Young LLP

[57] ABSTRACT

A head drum assembly of a VCR is disclosed which can prevent Jitter and Wow-flutter of signals while recording and reproducing signals and can additionally supply a lubricant. A bearing housing in which lubricant containing groove is formed is integrally formed with a lower drum. Two journal bearings are mounted on the inner side of the bearing housing and support and lubricate a shaft which drives an upper drum. The lubricant in each of the lubricant containing grooves flows into a clearance between the outer surface of the shaft and the inner surface of each of journal bearings along a path formed by the lubricant containing groove, slits, and the lubricating groove, so that an oil film is formed between the shaft and the inner surface of each of the journal bearings. The lubricant can be additionally supplied through lubricant supplying holes.

7 Claims, 5 Drawing Sheets

HEAD DRUM ASSEMBLY OF VIDEO CASSETTE RECORDER

BACKGROUND OF THE INVENTION

1. Field of the Invention

The present invention relates to a head drum assembly, and more particularly to a lubricating apparatus for a head drum assembly of a video cassette recorder, for supporting and lubricating a shaft of the head drum assembly.

2. Description of the Prior Art

In general, a video cassette recorder (hereinafter, referred to as a VCR) includes a base, a running system installed on the base for drawing out a magnetic tape from a cartridge and running the magnetic tape along a predetermined path, and a head drum assembly for recording and reproducing audio and video signals on and from the magnetic tape. In a head drum assembly, high reliability and stability is required, and vibration and noise should be controlled as much as possible, in order to clearly record and reproduce audio and video signals on and from the magnetic tape.

If a head drum assembly vibrates severely when it records and reproduces audio and video signals on and from the magnetic tape, Jitter and Wow-flutter of the signals are generated, thereby deteriorating the screen and voice quality of a VCR. In order to settle the above-mentioned problems, a head drum assembly is provided with a lubricating apparatus. A lubricating apparatus generally uses ball bearings or fluid dynamic pressure bearings.

FIG. 1 shows a conventional head drum assembly of a VCR which uses ball bearings. Referring to FIG. 1, a head drum assembly 100 includes a lower drum 110, an upper drum 120 for recording and reproducing audio and video signals on and from a magnetic tape (not shown), a motor 140 mounted on lower drum 110 for generating driving force, a shaft 150 for transferring the driving force of motor 140 to upper drum 120, and a lubricating apparatus 105 for supporting and lubricating shaft 150.

Lower drum 110 is fixed to a base (not shown) of the VCR. Motor 140 includes a stator 141 mounted on lower drum 110 at one side of the lower surface of lower drum 110, and a rotor 142 which is radially spaced apart from stator 141 and is rotated in magnetic conjunction with stator 141. Shaft 150 is connected to rotor 142 through a motor flange 122b so as to rotate together with rotor 142. An upper flange 122a is fixed to the upper portion of shaft 150.

Upper drum 120 is fixed to upper flange 122a by screws so as to rotate together with shaft 150. Mounted on upper drum 120 are at least two magnetic heads 121 for recording and reproducing audio and video signals on and from the magnetic tape. Magnetic heads 121 are electrically connected to lower drum 110 through the lower surface of upper drum 120 and a rotary transformer 130 installed to the upper surface of lower drum 110. Therefore, magnetic heads 121 can be electrically connected to a power source or the like while upper drum 120 is rotating.

The lubricating apparatus 105 includes a bearing housing 160, and upper and lower bearings 170a and 170b respectively inserted into the inner side of bearing housing 160 at the upper and lower ends of bearing housing 160. The outer side of bearing housing 160 is connected to the inner side of lower drum 110. An upper receiving recess 162a for receiving upper bearing 170a is formed at the inner side of bearing housing 160 at the upper end of bearing housing 160, and a lower receiving recess 162b for receiving lower bearing 170b is formed at the inner side of bearing housing 160 at the lower end of bearing housing 160. Each of bearings 170a and 170b includes an outer race inserted into each of receiving recesses 162a and 162b, an inner race into which shaft 150 is inserted, and a plurality of balls which are interposed between the inner and outer races, for supporting and lubricating shaft 150. The balls are made of steel, and a lubricant is supplied in a space between the inner and outer races in order to reduce the friction and to cool the bearings.

Lubricating apparatus 105 supports radial and thrust loads by the weight and rotation of shaft 150. When shaft 150, which is inserted into the inner race, rotates, the balls make rolling-contact with the inner and outer races so as to support and lubricate the loads of shaft 150.

Nevertheless, in head drum assembly 100, noises and vibrations are generated by the rolling contact of the balls. Especially, the vibration of the head assembly cause Jitter and Wow-flutter of the information, which can critically deteriorate the screen and voice quality of the VCR when they are recorded and reproduced on and from the magnetic tape.

Recently, a lubricating apparatus employing fluid dynamic pressure bearings are also used in order to improve the screen and voice quality of a VCR. Lubricating apparatuses using fluid dynamic pressure bearings are disclosed in U.S. Pat. No. 4,972,283 (issued to Kim on Nov. 20, 1990) and U.S. Pat. No. 5,277,499 (issued to Kameyama on Jan. 11, 1994).

FIG. 2 shows a head drum assembly using the lubricating apparatus of Kim. In the head drum assembly 200, a lubricating apparatus 205 includes a shaft 250 for transferring the rotating force to an upper drum 220, and a bearing housing 260 into which shaft 250 is inserted, bearing housing 260 having an air flowing hole 265 through which air can communicate between the inner and outer sides thereof.

A plurality of lubricating grooves 251 are formed at the upper and lower portions of the outer peripheral surface of shaft 250, and a fluid guiding groove 252 is formed at the lower portion of shaft 250 on the outer peripheral surface thereof.

At the upper portion of bearing housing 260 is formed a guiding groove 263 corresponding to a guide boss 224 in the lower surface of a flange 222a, and at the middle portion of bearing housing 260 is formed an air flowing groove 264 having a hole 265. At the lower portion of bearing housing 260 is formed a lubricant containing groove 267 having a plurality of lubricating holes 266 and a guide boss 229b corresponding to a guide groove 269a having spiral groove 268. Further, a rotor 242 having a magnet is fixed, by a screw 290, to a ring collar 255 secured to the lower portion of rotary shaft 250. Bearing housing 260 is fixed to the lower surface of lower drum 260.

Shaft 250, flange 222, upper drum 220, ring collar 255, and rotor 242 (hereinafter, the above parts are referred to as the rotating bodies) are all forced upward by the power of the magnet positioned in rotor 242. Then, the rotating bodies are moved downward by a downward acting power having a value which results from minusing the power of magnet from the weight of the rotating bodies. As a result, guide boss 269a of bearing housing 260 makes contact with guide groove 269b. As the lubricant contained in lubricant containing groove 267 lubricates contacting point between guide boss 269b and guide groove 269a, the friction at the contacting point decreases.

According to head drum assembly 200, when shaft 250 is rotated by motor 240, flanges 222 and upper drum 220 rotate together with shaft 250 and magnetic heads 221 attached to upper drum 220 record and reproduce audio and video signals on and from the magnetic tape. Nevertheless, in head drum assembly 200 of Kim, it is difficult to form grooves on the outer peripheral surface. The lubricant can be depleted by its leakage or the like, so that the vibrating effect deteriorates and undesired vibrations are generated during the rotation of upper drum 220.

A lubricating apparatus of Kameyama was suggested in order to settle the above-mentioned problems. The apparatus of Kameyama includes a shaft, and a sleeve having a thrust receiver opposite to an end surface of the shaft, into which the shaft is rotatably received. On the inner surface of the sleeve near an opening thereof is formed an annular groove. On the outer surface of the shaft is formed a plurality of shallow grooves. When the shaft rotates, a fluid flows between the inner surface of the sleeve and the outer surface of the shaft by following the shallow grooves. Then, the fluid flows upward from the center portion of the sleeve at which the shaft keeps in contact with the sleeve, so that the friction between the shaft and the sleeve decreases.

Nevertheless, in the lubricating apparatus of Kameyama, since the shaft rotates while it is floated from the center portion of the sleeve, the upper and lower portions of the shaft can be biased from each other. The biasing of the shaft causes vibration of the upper drum of a head drum assembly, thereby deteriorating the screen quality of the head drum assembly.

SUMMARY OF THE INVENTION

Therefore, it is an object of the present invention to provide a head drum assembly of a VCR which can reduce a vibration thereof, and thus record and reproduce video and audio signals clearly.

It is another objects of the present invention to provide a head drum assembly of a VCR which can additionally supply a lubricant thereinto.

In order to achieve the object of the present invention, there is provided a head drum assembly comprising:

a lower drum;

a motor for generating a driving force, the motor having a stator mounted on the lower drum below the lower drum and having a rotor which is radially spaced apart from the stator and rotates in magnetic conjunction with the stator;

a shaft connected to the rotor of the motor by a first flange, an upper portion of the shaft being inserted into a second flange, the shaft being rotated as the rotor rotates;

an upper drum positioned above the lower drum and fixed to the second flange, the upper drum having at least two magnetic heads for recording and reproducing signals of the video cassette recorder while the shaft is rotating;

a rotary transformer provided between a lower surface of the upper drum and an upper surface of the lower drum, for electrically connecting the magnetic heads to the lower drum;

two journal bearings, into which the shaft is inserted, wherein on an inner surface of each are formed two lubricating grooves respectively spaced apart from the upper and lower ends of each of the journal bearings, for supporting and lubricating the shaft; and a bearing housing an outer surface of which is connected to the inner surface of the lower drum, and at upper and lower ends of which bearing receiving recesses for receiving and supporting the journal bearings are respectively formed, wherein lubricant containing grooves are respectively formed on inner surfaces of the bearing receiving recesses.

According to the present invention, a first slit and a second slit are respectively formed on the outer and inner surfaces of each of the journal bearings along the length of each of the journal bearings and third slits are radially formed on the upper and lower surfaces of each of the journal bearings, the first and second slits communicating with the lubricant containing groove and the lubricating groove respectively, the third slits connecting the first and second slits so that the lubricant in each of the lubricant containing grooves flows into a clearance between the outer surface of the shaft and the inner surface of each of journal bearings along the path formed by the lubricant containing groove, the first slit, the third slits, the second slit, and the lubricating groove.

When the shaft rotates, the fluid pressure between the journal bearings and the shaft decreases. The lubricant contained in each of the lubricant containing grooves flows into a clearance between the shaft and each of the journal bearings by a pressure drop, capillary action through the slits, and the viscocity of the lubricant. The friction between the shaft and the inner surface of each of the journal bearings is decreased by an oil film formed between the shaft and the inner surface of each of the journal bearings.

A plurality of lubricating recesses, each of which is defined by a side wall, a bottom surface, and an inclined surface, are formed on the upper surface of the upper journal bearing. A plurality of protrusions are formed between adjacent lubricating recesses so as to support and lubricate the second flange.

The journal bearings are made of a sintering metal of copper or molded with Teflon whose friction coefficient is low. Lubricant supplying holes are formed in the bearing housing so as to additionally supply the lubricant into the lubricant containing grooves.

In the head drum assembly according to the present invention, the depletion of the lubricant can be prevented by additional supplies of the lubricant and the structure of the head drum assembly is so simple that the manufacturing cost of the assembly can be reduced. Furthermore, the loads generated by the shaft and the upper drum can be effectively supported, thereby preventing Jitter and Wow-flutter of the signals of the VCR.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE PREFERRED EMBODIMENT

Hereinafter, a preferred embodiment of the present invention will be described in detail with reference to the accompanying drawings.

Figure 1:
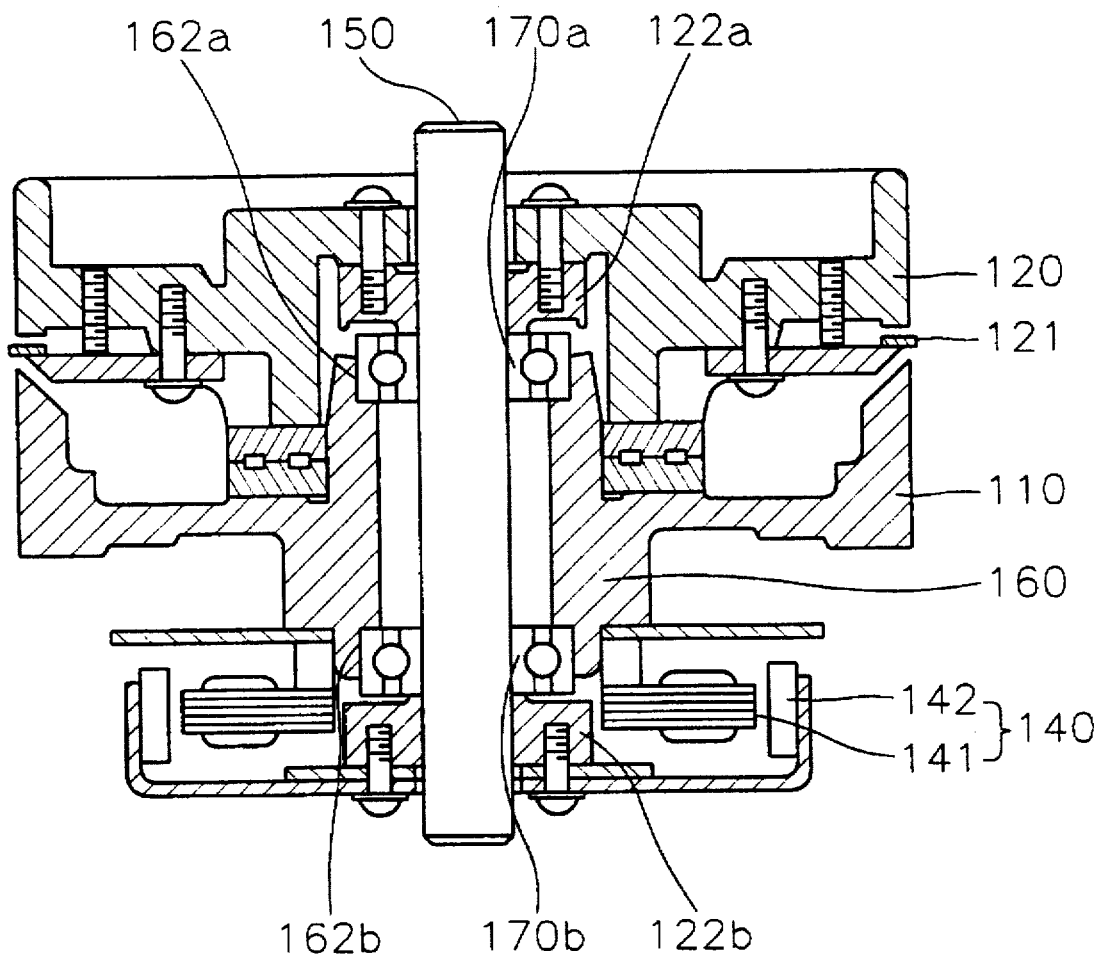
FIG. 1 is a longitudinal sectional view of a conventional head drum assembly having a lubricating apparatus employing ball bearings.
Figure 2:
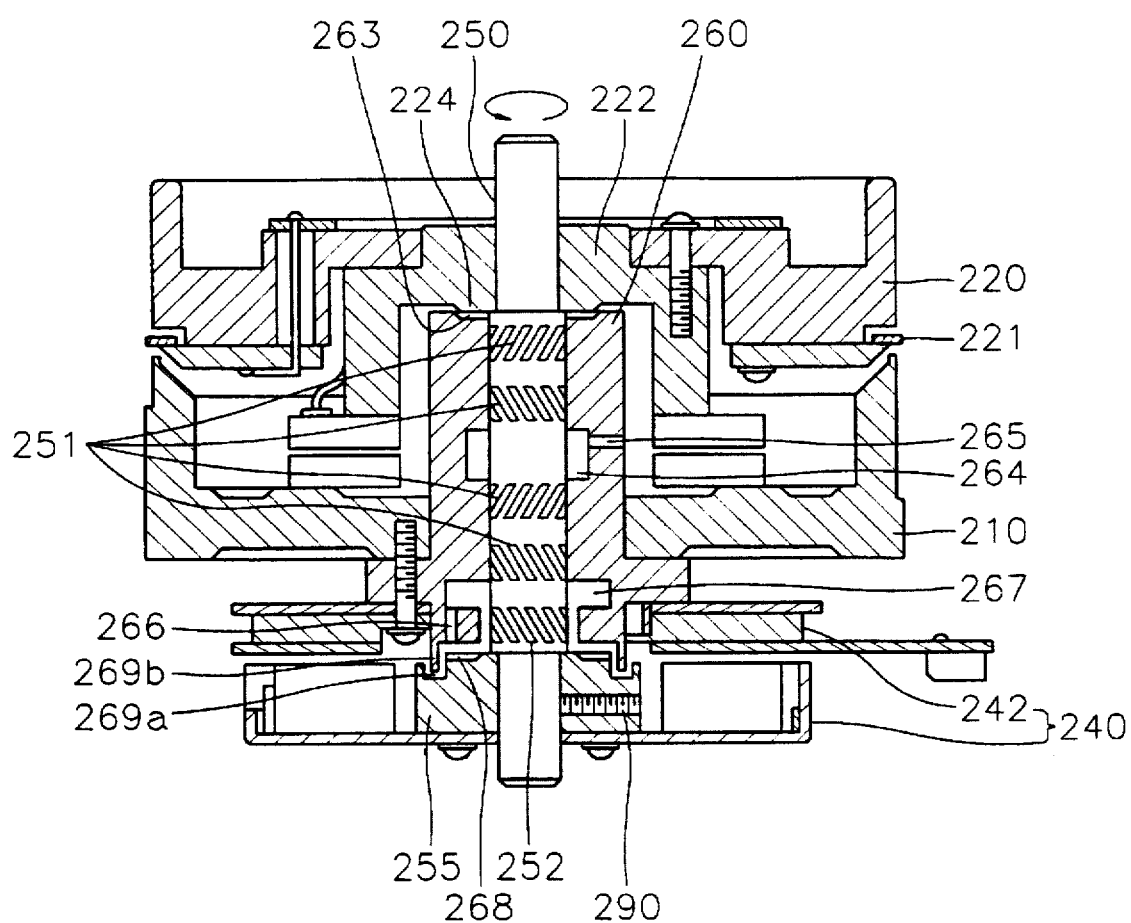
FIG. 2 is a longitudinal sectional view of a conventional head drum assembly having a lubricating apparatus employing fluid dynamic pressure bearing.
Figure 3:
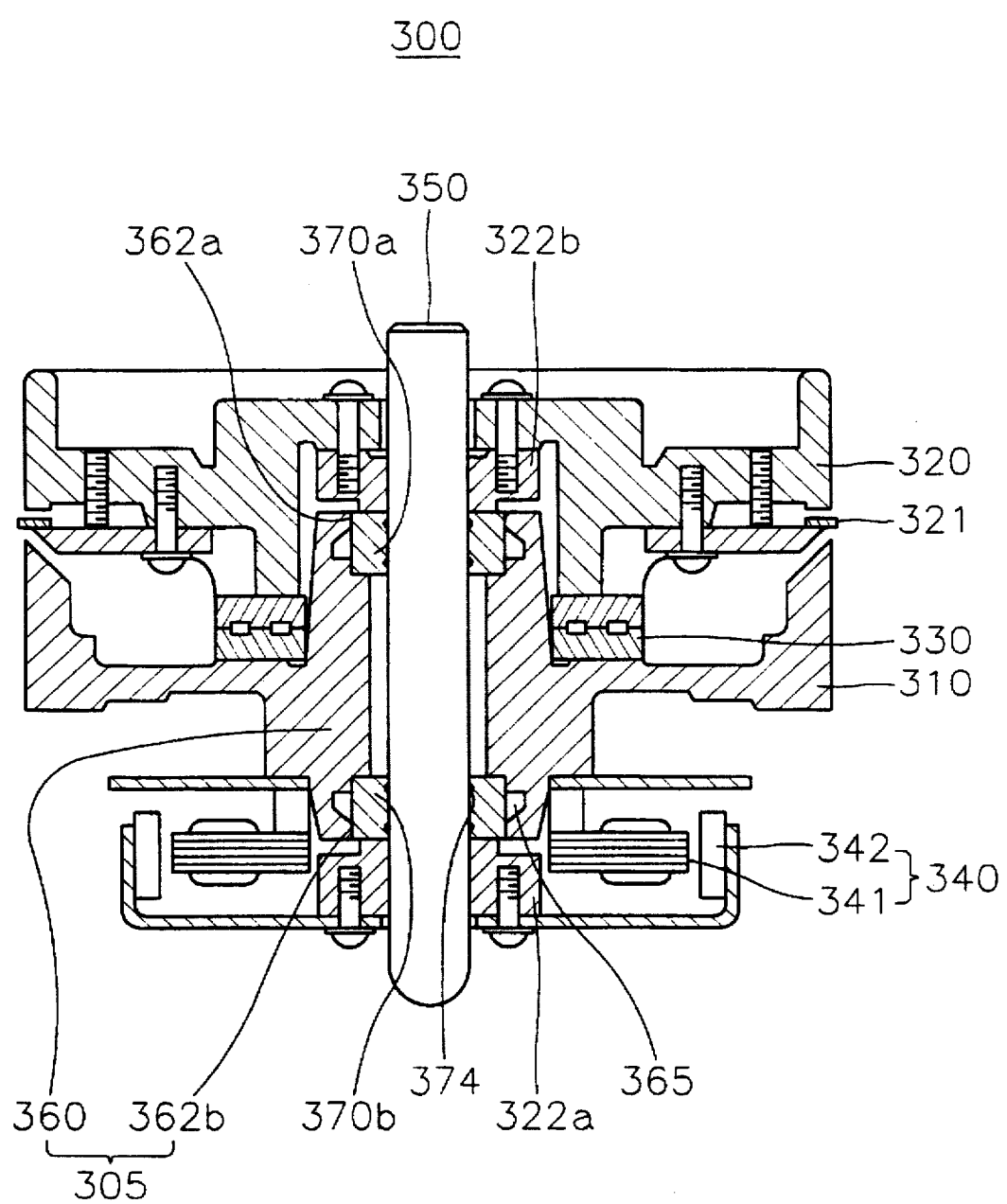
FIG. 3 is a longitudinal sectional view of a head drum assembly having a lubricating apparatus according to one embodiment of the present invention.

FIG. 3 shows a head drum assembly for a VCR according to a preferred embodiment of the present invention. Referring to FIG. 3, a head drum assembly 300 comprises a lower drum 310 mounted on a base (not shown) of the VCR, an upper drum 320 for recording and reproducing audio and video signals on and from a magnetic tape (not shown), a motor 340 mounted on lower drum 310 for generating a driving force, a shaft 350 for transferring the driving force to upper drum 320, and a lubricating apparatus 305 into which shaft 350 is inserted, for supporting and lubricating shaft 350.

Lower drum 310 is fixed to the base of the VCR. Motor 340 includes a stator 341 mounted on the lower surface of lower drum 310 at one side thereof, and a rotor 342 radially spaced apart from stator 341 by a distance for rotating by magnetic conjunction with stator 341. Shaft 350 is connected to rotor 342 by a first flange 322a so as to rotate together with rotor 342. Shaft 350 is inserted into a second flange 322b at an upper portion of shaft 350.

Upper drum 320 is fixed to second flange 322b by screws. Mounted on upper drum 320 is at least two magnetic heads 321 for recording and reproducing the audio and video signals on and from the magnetic tape while shaft 350 is rotating. Magnetic heads 321 are electrically connected to lower drum 310 by a rotary transformer 330 which is installed on the lower surface of upper drum 320 and the upper surface of lower drum 310. Therefore, magnetic heads 321 can maintain electrical connection with a power source or the like while upper drum 320 is rotating.

Figure 4:
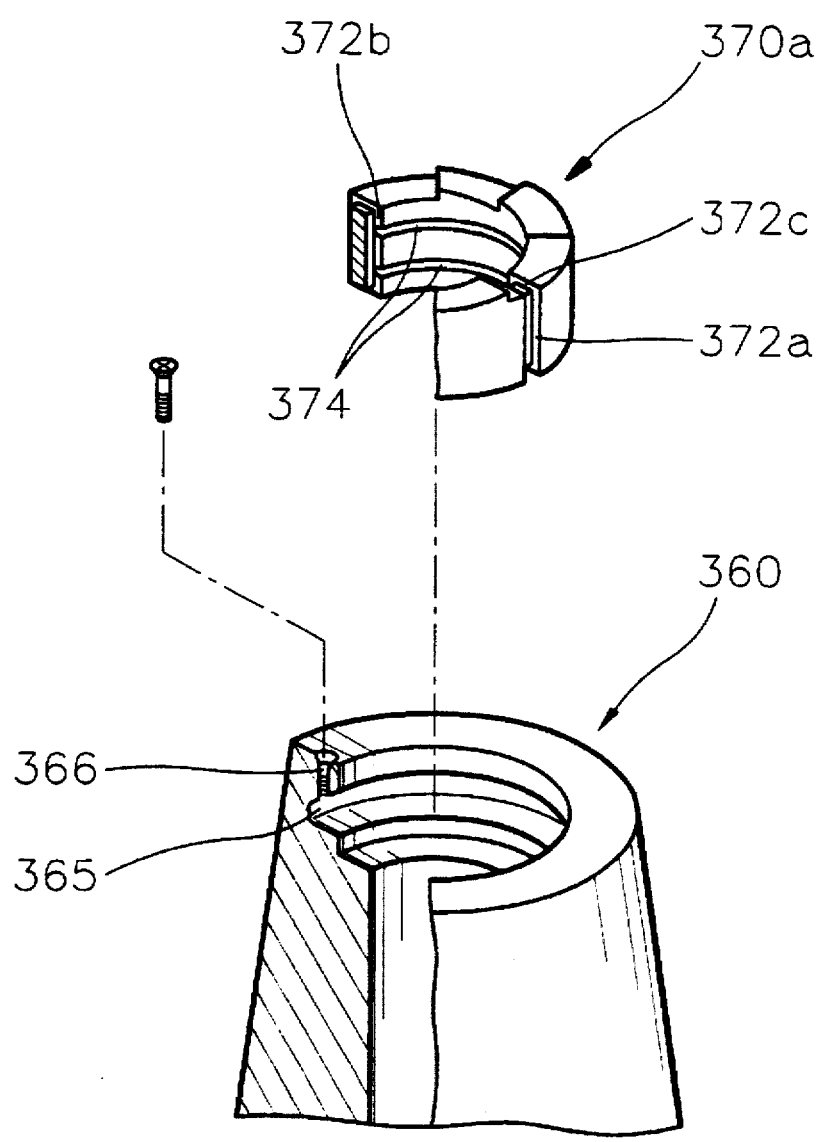
FIG. 4 is a partially cut-away perspective view for showing a bearing housing and a journal bearing in order to explain the lubricating apparatus as shown in FIG. 3.

FIG. 4 is a perspective view for explaining the lubricating apparatus as shown in FIG. 3. Referring to FIGS. 3 and 4, lubricating apparatus 305 comprises a bearing housing 360 connected to the inner side of lower drum 310, and a journal bearing 30a and 370b into which shaft 350 is inserted.

Bearing housing 360 is integrally formed with lower drum 310, and at the upper and lower ends thereof are formed bearing receiving recesses 362a and 362b into which journal bearings 370a and 370b are inserted. The inner surface of each of receiving recesses 362a and 362b is formed such that each of journal bearings 370a and 370b can be press-fitted therein. Each of journal bearings 370a and 370b is axially supported by a supporting surface of each of receiving recesses 362a and 362b. On the inner surface of each of receiving recesses 362a and 362b is formed a lubricant containing groove 365. A lubricant supplying hole 366 extends from the outside to the inner surface of each of lubricant containing grooves 365 is formed in order to supply a lubricant into each of lubricant containing grooves 365.

Journal bearings 370a and 370b are inserted into and fixed to bearing housing 360. Lubricating grooves 374 are formed on the inner peripheral surface of bearing housing 360. First and second slits 372a and 372b are respectively formed on the outer and inner surfaces of each of journal bearings 370a and 370b along its length. Third slits 372c are formed on the upper and lower ends of each of journal bearing 370a and 370b so that each of third slits 372c is connected to first and second slits 372a and 372b.

When shaft 350 rotates, the lubricant contained in each of lubricant containing grooves 365, flows into a clearance between the outer surface of shah 350 and the inner surface of each of journal bearings 370a and 370b along the path formed by lubricant containing grooves 365, first slit 372a, third slits 372c, second slit 372b, and lubricating grooves 374. The lubricant flowed into the inner surface of journal bearings 370a and 370b is supplied to the entire surface of journal bearings 370a and 370b, so that an oil film is formed between shaft 350 and the inner surface of journal bearings 370a and 370b. The oil film decreases the friction between shaft 350 and journal bearings 370a and 370b.

Figure 5:
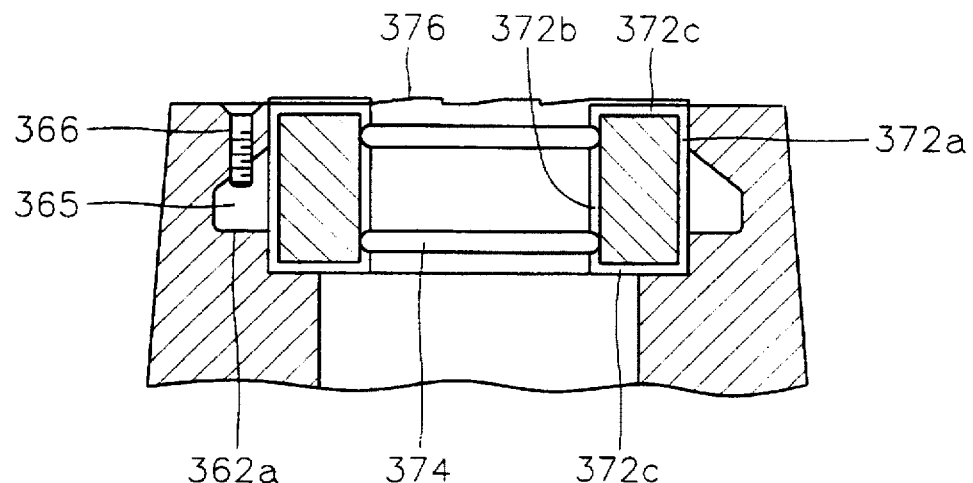
FIG. 5 is a longitudinal sectional view for showing the bearing housing and journal bearing of FIG. 4.

As shown in FIGS. 4 and 5, lubricating grooves 374 of each of journal bearings 370a and 370b are respectively formed spaced apart from the upper and lower ends of each of journal bearings 370a and 370b by a distance D1. The distance D1 is a distance from the upper (or lower) end of each of journal bearings 370a and 370b to the center of the upper (or lower) one of lubricting grooves 374, and is equal to or greater than one hundredth of the length of each of journal bearings 370a and 370b and equal to or smaller than one tenth of the length of each of journal bearings 370a and 370b so that the effective lubricating area of each of journal bearings 370a and 370b can be maximized.

Figure 6:
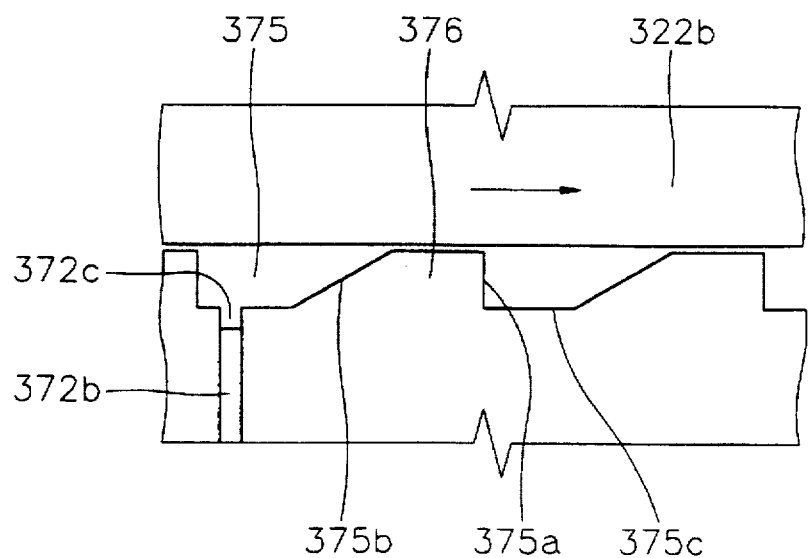
FIG. 6 is a perspective view for showing the contacting condition between the upper surface of the journal bearing of FIG. 4 and the lower surface of a flange.

FIG. 6 schematically shows the contacting condition between the upper surface of upper journal bearing 370a and the lower surface of a second flange 322b. As shown in FIGS. 4 and 6, on the upper surface of upper journal bearing 370a in the radial direction are formed a plurality of lubricating recesses 375, each of which is defined by a side wall 375a, a bottom surface 375c, and an inclined surface 375b, so that the same number of protrusions 376 are formed between adjacent lubricating recesses 375. Each of protrusions 376 preferably has a shape like a saw-tooth, and supports and lubricates second flange 322b.

Upper third slit 372c is formed on one of the bottom surfaces 375c, and the lubricant in lubricant containing grooves 365 flows into lubricating grooves 375 through third slits 372c. When shaft 350 and second flange 322b rotates, since the pressure of the lubricant drops as second flange 322b rotates, the lubricant in lubricating grooves 375 ascends to the top of protrusions 376 along inclined surfaces 375b. As a result, oil films are formed between the lower surface of second flange 322b and the top of protrusions 376, thereby decreasing the friction between them. The shape of protrusions 376 decreases the friction area between upper journal bearing 370a and second flange 322b, thereby also decreasing the friction between them.

If dirt is contained in the lubricant, shaft 350 is damaged by scratches or the like when rotating, and thus the strength of shaft 350 is decreased. Journal bearings 370 are made of a sintering metal of copper or molded with Teflon whose friction coefficient is low. The static friction coefficient of Teflon against steel is 0.04, which is very small.

Hereinafter, the operation of above-described head drum assembly according to the preferred embodiment will be explained.

With reference to FIG. 3, an amount of lubricant is supplied into lubricant containing grooves 365 through lubricant supplying holes 366, and then lubricant supplying holes 366 are closed by screws.

If electric current is applied to motor 340, rotor 342 and shaft 350 are rotated in magnetic conjunction with stator 341. While shaft 350 is rotating, magnetic heads 321 attached to upper drum 320 records and reproduces the audio and video signals on and from a magnetic tape of the VCR. Magnetic heads communicates with other devices through rotary transformer 330.

As shown in FIG. 5, when shaft 350 rotates, the fluid pressure between journal bearings 370a and 370b and shaft 350 decreases. The lubricant contained in each of lubricant containing grooves 365 flows into a clearance between shaft 350 and each of journal bearings 370a and 370b by capillary action through first slit 372a, third slits 372c, and second slit 372b on each of journal bearings 370a and 370b and a pressure drop. The lubricant forms an oil film between shaft 350 and the inner surface of each of journal bearings 370a and 370b when it is flowed into a clearance therebetween shaft by the viscosity of the lubricant and the rotation of shaft 350. Therefore, the friction between shaft 350 and the inner surface of each of journal bearings 370a and 370b is decreased.

As shown in FIG. 6, when upper drum 320 rotates, the lower surface of second flange 322b on which head drum 320 is mounted keeps in contact with the top surface of upper journal bearing 370a. On the other hand, some of the lubricant ascends to the top surface of upper journal bearing 370a along inclined surfaces 375b. As an oil film is formed between the lower surface of second flange 322b and the top of protrusions 376, and the friction between shaft 350 and journal bearings 379a and 370b is decreased. Therefore, vibration and noise generated by the rotation of shaft 350 can be decreased, and thus signals on and from the tapes can be clearly recorded and reproduced and the screen and voice quality of the VCR can be increased.

According to the head drum assembly of the present invention, as above-mentioned, vibration and noise can be effectively controlled, and the structure of the head drum assembly is simple, so the manufacturing cost of the assembly can be reduced. Furthermore, since lubricant supplying holes are provided with the assembly, the lubricant can be additionally supplied if necessary.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A head drum assembly of a video cassette recorder comprising:

a lower drum;

a motor for generating a driving force, said motor having a stator mounted on said lower drum below said lower drum and having a rotor which is radially spaced apart from the stator and rotates in magnetic conjunction with the stator;

a shaft connected to the rotor of said motor by a first flange, an upper portion of said shaft being inserted into a second flange, said shaft being rotated as the rotor rotates;

an upper drum positioned above said lower drum and fixed to the second flange, said upper drum having at least two magnetic heads for recording and reproducing signals of the video cassette recorder while said shaft is rotating;

a rotary transformer provided between a lower surface of said upper drum and an upper surface of said lower drum, for electrically connecting the magnetic heads to said lower drum;

two journal bearings of fluid dynamic pressure type, into which said shaft is inserted, wherein on an inner surface of each are formed two lubricating grooves respectively spaced apart from the upper and lower ends of each of said journal bearings, for supporting and lubricating said shaft, each of said journal bearings having slits connected to the lubricating grooves; and a bearing housing an outer surface of which is connected to the inner surface of said lower drum, and at upper and lower ends of which bearing receiving recesses for receiving and supporting said journal bearings are respectively formed, wherein lubricant containing grooves connected to the slits are respectively formed on inner surfaces of the bearing receiving recesses so that the lubricant in the lubricant containing grooves flows between said shaft and each of said journal bearings.

2. A head drum assembly of a video cassette recorder according to claim 1, wherein a first slit and a second slit are respectively formed on outer and inner surfaces of each of said journal bearings along a length of each of said journal bearings and third slits are radially formed on upper and lower surfaces of each of said journal bearings, the first and second slits communicating with the lubricant containing groove and the lubricating groove respectively, the third slits connecting the first and second slits so that the lubricant in each of the lubricant containing grooves flows into a clearance between an outer surface of said shaft and the inner surface of each of journal bearings along a path formed by the lubricant containing groove, the first slit, the third slits, the second slit, and the lubricating groove.

3. A head drum assembly of a video cassette recorder according to claim 2, wherein a plurality of lubricating recesses, each of which is defined by a side wall, a bottom surface, and an inclined surface, am formed on an upper surface of said upper journal bearing, the same number of protrusions as the number of the lubricating recesses being formed between adjacent lubricating recesses, the third slit being formed on one of the bottom surfaces.

4. A head drum assembly of a video cassette recorder according to claim 1, wherein a distance between the lubricating grooves formed on the inner surface of each of said journal bearings is equal to or greater than one hundredth of a length of each of said journal bearings and equal to or smaller than one tenth of the length of each of said journal bearings.

5. A head drum assembly of a video cassette recorder according to claim 1, wherein said journal bearings are comprised of a sintering metal of copper.

6. A head drum assembly of a video cassette recorder according to claim 1, wherein lubricant supplying holes for supplying a lubricant into the lubricant containing grooves of said bearing housing from outside are respectively formed in upper and lower portions of said bearing housing.

7. A head drum assembly of a video cassette recorder according to claim 6, wherein each of the lubricant supplying holes is sealingly closed by a screw.

* * * * *